(12) United States Patent
Motomatsu

(10) Patent No.: US 8,629,969 B2
(45) Date of Patent: Jan. 14, 2014

(54) LIQUID CRYSTAL DISPLAY PANEL AND METHOD OF MANUFACTURING THE LIQUID CRYSTAL DISPLAY PANEL

(75) Inventor: Toshihiko Motomatsu, Kawasaki (JP)

(73) Assignee: Gold Charm Limited, Apia (WS)

( * ) Notice: Subject to any disclaimer, the term of this patent is extended or adjusted under 35 U.S.C. 154(b) by 536 days.

(21) Appl. No.: 12/266,184

(22) Filed: Nov. 6, 2008

(65) Prior Publication Data

US 2009/0122244 A1 May 14, 2009

(30) Foreign Application Priority Data

Nov. 8, 2007 (JP) ................................. 2007-290767
Dec. 10, 2007 (JP) ................................. 2007-318700
Aug. 1, 2008 (JP) ................................. 2008-199609
Aug. 1, 2008 (JP) ................................. 2008-199610

(51) Int. Cl.
*G02F 1/1339* (2006.01)

(52) U.S. Cl.
USPC ............................ 349/190; 349/58; 349/125

(58) Field of Classification Search
USPC ........................................... 349/58, 125, 190
See application file for complete search history.

(56) References Cited

U.S. PATENT DOCUMENTS

| 6,335,775 | B1 * | 1/2002 | Iwamura et al. | 349/125 |
| 7,518,702 | B2 * | 4/2009 | Sakurada | 349/190 |
| 7,582,904 | B2 * | 9/2009 | Fujii et al. | 257/72 |
| 2009/0002619 | A1 | 1/2009 | Kanai et al. | |
| 2012/0229736 | A1 * | 9/2012 | Osaki et al. | 349/96 |

FOREIGN PATENT DOCUMENTS

| CN | 1572495 A | 2/2005 |
| CN | 101021631 A | 8/2007 |
| JP | 3-2826 A | 1/1991 |
| JP | 4-60518 A | 2/1992 |
| JP | 10-260406 A | 9/1998 |
| JP | 11-38424 A | 2/1999 |
| JP | 2003-315810 A | 11/2003 |
| JP | 2004-287468 A | 10/2004 |
| JP | 2005-249881 A | 9/2005 |
| JP | 2005-283693 A | 10/2005 |
| JP | 2006-337935 A | 12/2006 |
| JP | 2007-25189 A | 2/2007 |
| JP | 2009-31774 A | 2/2009 |

OTHER PUBLICATIONS

Communication, dated Sep. 11, 2012, issued by Japanese Patent Office in counterpart Japanese Application No. 2008-199609.

* cited by examiner

*Primary Examiner* — Eric Wong
(74) *Attorney, Agent, or Firm* — Altis Law Group, Inc.

(57) ABSTRACT

A liquid crystal display panel has a pair of opposed substrates, a seal material and a liquid crystal material. The seal material bonds the pair of substrates to each other, and is formed into a closed curve shape enclosing a region including a pixel region. The liquid crystal material is filled in a region enclosed by the pair of substrates and the seal material. A surface of interface which is a surface made up of at least one substrate of the pair of substrates, and which is in contact with the liquid crystal material in a frame region enclosed by an outer periphery of the pixel region and an inner periphery of the seal material, includes a low wettability structure in which wettability to the liquid crystal material is lower than that of the surface of the one substrate in the pixel region.

8 Claims, 11 Drawing Sheets

(a)

(b)

(a)

(b)

(a)

(b)

LIQUID CRYSTAL DISPLAY PANEL AND METHOD OF MANUFACTURING THE LIQUID CRYSTAL DISPLAY PANEL

This application is based upon and claims the benefit of priority from Japanese patent application No. 2007-290767, filed on Nov. 8, 2007, Japanese patent application No. 2007-318700, filed on Dec. 10, 2007, Japanese patent application No. 2008-199609, filed on Aug. 1, 2008 and Japanese patent application No. 2008-199610, filed on Aug. 1, 2008, the disclosures of which are incorporated herein in its entirety by reference.

BACKGROUND OF THE INVENTION

1. Field of the Invention

The present invention relates to a liquid crystal display panel and a method of manufacturing the same.

2. Description of the Related Art

FIG. 1 is a schematic sectional view showing the structure in the vicinity of the frame of the liquid crystal display panel of a related art. Liquid crystal display panel 1 has TFT substrate 2 on which switching elements 8 such as thin film transistors (TFTs), for example, are formed in a matrix shape and CF substrate 3 on which color filter (CF) 7, black matrix (BM) 6 and the like are formed. Alignment layers 9 to which alignment treatment is applied, are formed respectively on the opposed surfaces, which are opposite to each other, of substrates 2 and 3. In order to form a predetermined gap between both substrates 2 and 3, pillar spacer 10 and seal material 5 are formed between both substrates 2 and 3. Liquid crystal material 4 is sealed in the gap by them.

FIG. 2 is a flowchart showing a method of manufacturing the liquid crystal display panel shown in FIG. 1. First, in the seal coating step, a seal material is coated onto a predetermined position of the TFT substrate, and an outer peripheral (auxiliary) seal and a main seal are formed in an uncured state.

Subsequently, in the Ag coating step, Ag-transfer is coated to a predetermined position of the TFT substrate in a dotted form (in the case of manufacturing the liquid crystal display panel of a Twisted Nematic (TN) mode).

Next, in the liquid crystal dropping state, a liquid crystal material is dropped by a predetermined drop amount to a predetermined position inside the above described main seal in a matrix form, a linear form or a radial form. In the pixel region of the CF substrate, a pillar spacer or a spherical spacer for forming a predetermined gap between the substrates is disposed in advance.

Thereafter, in the bonding step, both the above described substrates are brought into contact with each other and pressurized. Thereby, the liquid crystal material is uniformly diffused into the entire pixel region between the substrates, and the gap between the substrates is uniformly formed.

When the substrates bonded to each other are transported for the next step, temporary fastening is performed for suppressing misalignment in fitting both the substrates. As temporary fastening of the seal material, ultraviolet (UV) temporary curing is partially performed for several spots. At this time, the liquid crystal material quickly diffuses with the lapse of time, and passes from the pixel region to the frame region (region where BM is formed) outside of the pixel region and reaches the seal material. Specifically, then, the liquid crystal material is in contact with the seal material.

Next, in the UV curing step, the seal material is cured by UV radiation. At this time, the seal material is in a semi-cured state. Until the UV curing step is completed, the seal material in the uncured state and the liquid crystal material are in contact with each other. Further, in the heat curing step which is performed next, the seal material is completely cured, but at the early stage of the heat curing step, the seal material in the semi-cured state and the liquid crystal material continue to be in contact with each other.

As described above, in the liquid crystal panel shown in FIG. 1, the seal material in the uncured or semi-cured state and the liquid crystal material are in contact with each other during the bonding step, the UV curing step and the heat curing step. Thereby, as shown in FIG. 1, a large quantity of impurities 16 such as, for example, impurity ions elute from seal material 5 into liquid crystal material 4. Thus, the liquid crystal material 4 is contaminated by impurity ions.

As a substance which contaminates liquid crystal material 4, there are cited an oligomer component, an organic matter such as phthalate ester, ion impurities such as Na, K and Cl and the like which elute from seal material 5 in the uncured or semi-cured state.

Further, in the above described liquid crystal panel, liquid crystal material 4 is in contact with seal material 5 in the uncured or semi-cured state, and liquid crystal material 4 sometimes erodes the interface of seal material 5 and the base of seal material 5. According to this, the problem of reduction in seal bonding strength in the interface between seal material 5 and the substrate occurs. As a result, a stain, unevenness, seal removal and the like sometimes occur in the peripheral portion of the seal material of the liquid crystal display panel after a reliability test is performed. Hence, in the above described liquid crystal panel, reduction in display quality and in reliability occur.

As related art that describes solving the problems of contamination of the liquid crystal material and reduction in the bonding strength of the sealing material due to contact of the seal material in the uncured or semi-cured state with the liquid crystal material, the following two related arts can be cited.

(1) Related Art Using a Barrier (2) Related Art of Increasing the Surface Energy FIG. 3 shows one example of a liquid crystal display panel using art (1) using a barrier. In the liquid crystal display panel, projected portion 12 is formed between the pixel region and the region coated with seal material 5 of TFT substrate 2 as shown in FIG. 3. Diffusion of liquid crystal material 4 is suppressed by adjusting the distance between projected portion 12 and CF substrate 3 which is opposite to projected portion 12.

As documents describing related art using the barrier, there are cited Japanese Patent Laid-Open No. 1999-38424, and Japanese Patent Laid-Open No. 2003-315810. In the liquid crystal display panel described in Japanese Patent Laid-Open No. 1999-38424, projected portions 12 are formed between the pixel region and the region coated with seal material 5 of the TFT substrate. It is disclosed that a vertical alignment layer is formed on the top portion of projected portion 12 as an alignment layer. Japanese Patent Laid-Open No. 2003-315810 discloses that a number of flow control walls 13 for liquid crystal material 4 are formed in the pixel region, or inside and outside the pixel region, as shown in FIG. 4.

Related art of increasing the surface energy of the above described (2) is disclosed in Japanese Patent Laid-Open No. 1998-260406. In the publication, the surface of the alignment layer at the position away from the display region which is the pixel region is reformed. Thus, the surface energy of the reformed surface is increased more than that of the alignment layer of the display region.

In Japanese Patent Laid-Open No. 1999-38424, liquid crystal diffusion control is performed using the vertical alignment layer and the projected portion, and the effect can be obtained only in the liquid crystal display panel using the vertical alignment layer that has low wettability to the liquid crystal material. Accordingly, there is the problem that in the case of using the other ordinary alignment layers, liquid crystal diffusion speed cannot be decreased.

Further, the projected portion is formed so that the clearance between the projected portion and the substrate opposite to the projected portion becomes extremely small, and therefore, the problem of contamination of the liquid crystal material is solved to a certain extent. However, no consideration is given to the fact that the gap in the peripheral portion of the seal material becomes uneven by forming the projected portion. Specifically, the suppressing method of the liquid crystal diffusion according to the above described publication directly stops the flow of the liquid crystal material, and the diffusion speed is controlled by the height or the like of the projected portion. Therefore, in order to decrease the liquid crystal diffusion speed, a high projected portion needs to be formed in a wide range in the peripheral portion of the seal material.

Depending on the variation of the height of the projected portion, there arises the problem that the projected portion locally contacts the substrate that is opposite to the projected portion. When the projected portion and the substrate are in contact with each other, local stress occurs, and a variation of gap between substrates occurs in the peripheral portion of the seal material. As a result, reduction in display quality occurs in the boundary of the black matrix formation part and the pixel region. This reduction becomes significantly noticeable as the distance between the substrates becomes shorter.

Further, in Japanese Patent Laid-Open No. 2003-315810, a number of flow control walls each in the shape of the projected portion for directly stopping the flow of the liquid crystal material are disposed. Therefore, the problem of contamination of the liquid crystal material is solved to some extent. However, consideration is not given to unevenness of the gap which occurs as a result of disposing a number of the above described flow control walls. Specifically, the suppressing method according to the above described publication suppresses liquid crystal diffusion by disposing a number of flow control walls each in the shape of the projected portion for directly stopping the flow of the liquid crystal material.

A number of the flow control walls are disposed in the pixel region, or in the pixel region and outside the pixel region so as to be in contact with the substrate that is opposite to the above described flow control walls. Therefore, in the pixel region and the peripheral portion of the seal material, variation of the gap due to contact stress occurs. As a result, display quality of the pixel region degrades, and display quality in the boundary of the black matrix formation part and the pixel region degrades.

Further, in Japanese Patent Laid-Open No. 1998-260406, by increasing the surface energy of the alignment layer at the position away from the display region more than that of the alignment layer of the display region, the problem in which the ionic impurities in the seal material diffuse to the liquid crystal material is solved to some extent. However, the fact that the seal material in the uncured or semi-cured state is in contact with the liquid crystal material does not change. Specifically, in the liquid crystal panel described in the above described publication, the surface energy of the alignment layer at the position away from the display region is increased more than that of the alignment layer of the display region, and as a result, the ionic impurities which elute or which have already eluted to the liquid crystal material from the seal material are only adsorbed by it and suppressed from diffusing to the liquid crystal material. Accordingly, the seal material in the uncured or semi-cured state and the liquid crystal material are in contact with each other from the manufacturing stage. Accordingly, a large quantity of ion impurities cannot be suppressed from eluting from the manufacturing stage.

Diffusion of the liquid crystal material is not controlled in the bonding step, the UV curing step or the heat curing step as described above, and therefore, the seal material in the uncured or semi-cured state and the liquid crystal material are in contact with each other. As a result, the problems of contamination of the liquid crystal material and reduction in the seal bonding strength occur.

SUMMARY OF THE INVENTION

The present invention is made in view of the above described problems, and examples of its object includes suppressing contamination of a liquid crystal material and reduce of the bonding strength of the seal material, and improvement of the display quality and reliability of a liquid crystal display panel.

A liquid crystal display panel according to one aspect of the present invention includes a pair of opposed substrates, a seal material and a liquid crystal material. The seal material bonds the pair of substrates to each other. The seal material enclosing a region including a pixel region is formed. The liquid crystal material is filled into a region enclosed by the pair of substrates and the seal material. A surface of interface which made up of at least one substrate of the pair of substrates and which is in a frame region enclosed by an outer periphery of the pixel region and an inner periphery of the seal material, includes a low wettability structure. The low wettability structure has wettability to the liquid crystal material that is lower than that of the surface of the one substrate in the pixel region.

A method of manufacturing a liquid crystal display panel according to another aspect of the present invention is a method of manufacturing a liquid crystal display panel including coating a seal material on one substrate out of a pair of substrates with a seal material in a closed curve form to enclose a pixel region, dropping a liquid crystal material into a region enclosed by the seal material on the one substrate, bonding the pair of substrates to each other, and curing the seal material to seal the liquid crystal material, and includes forming a low wettability structure. In forming the low wettability structure, the low wettability structure having wettability to the liquid crystal material that is lower than that of the surface of the substrate in the pixel region is formed, on the surface of interface, which is a surface of at least one substrate out of the pair of substrates, and which is in contact with the liquid crystal material in a frame region enclosed by an outer periphery of the pixel region and an inner periphery of the seal material.

The above and other objects, features and advantages of the present invention will become apparent from the following description with reference to the accompanying drawings which illustrate examples of the present invention.

EXEMPLARY EMBODIMENT

Hereinafter, exemplary embodiments will be described with reference to the drawings.

A First Exemplary Embodiment

Figure 1:
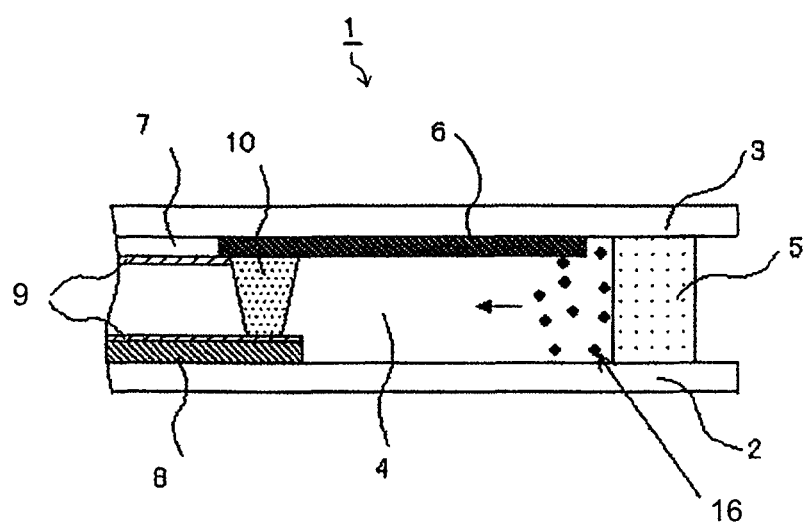
FIG. 1 is a sectional view showing the structure of the vicinity of a frame of a liquid crystal display panel of the related art.
Figure 2:
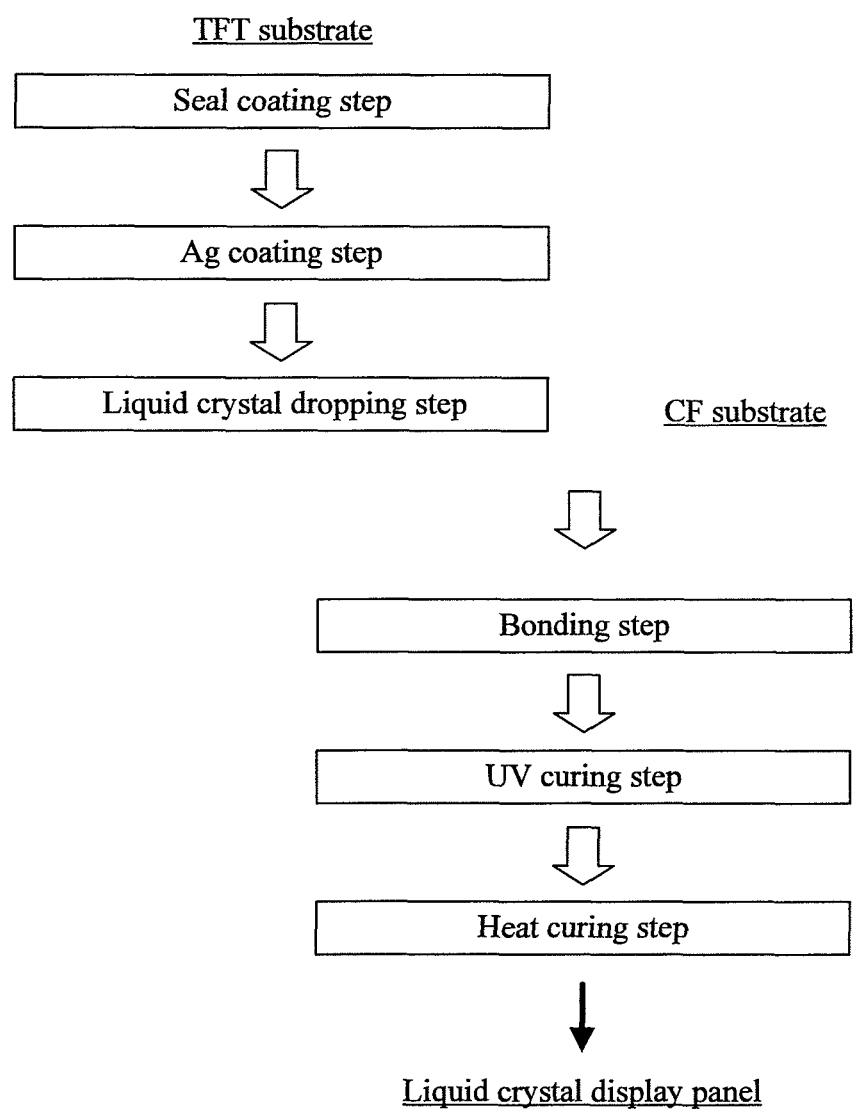
FIG. 2 is a flowchart showing the manufacture process of the liquid crystal display panel relating to the related art.
Figure 3:
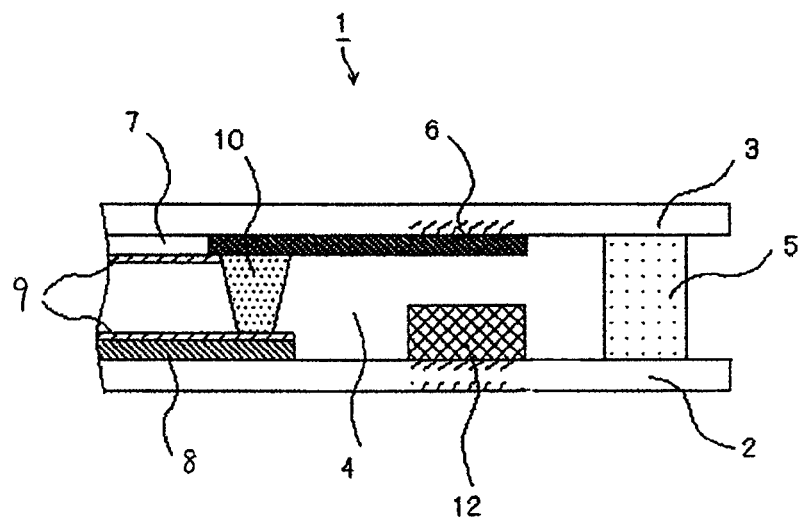
FIG. 3 is a sectional view showing another structure of the vicinity of the frame of the liquid crystal display panel relating to the related art.
Figure 4:
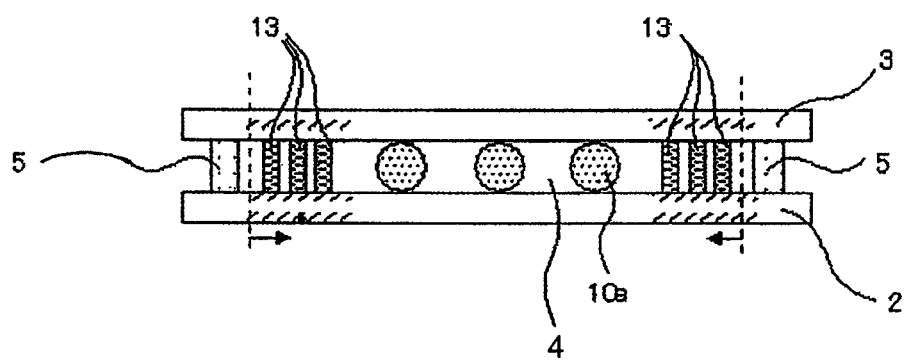
FIG. 4 is a sectional view showing another structure of the liquid crystal display panel relating to the related art.
Figure 5:
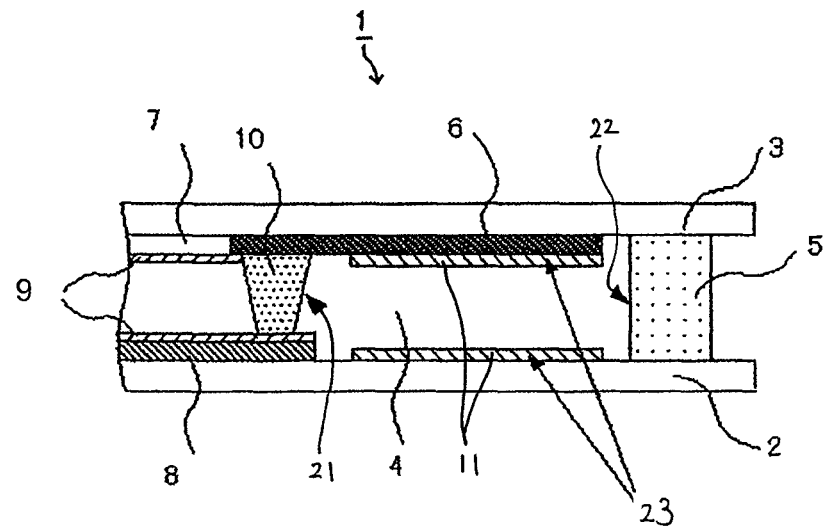
FIG. 5 is a schematic sectional view showing the structure of the vicinity of a frame of a liquid crystal display panel according to a first exemplary embodiment.

FIG. 5 is a schematic sectional view showing the structure of a liquid crystal display panel of a first exemplary embodiment. Liquid crystal display panel 1 includes one substrate such as, for example, a TFT substrate, on which switching elements 8 are formed in a matrix form, and the other substrate on which color filter 7, black matrix 6 and the like are formed. Hereinafter, the one substrate will be called TFT substrate 2, and the other substrate will be called CF substrate 3.

In a frame region (enclosed by outer periphery 21 of a pixel region and inner periphery 22 of seal material 5), a film made of an organic or inorganic substance is formed on a surface of TFT substrate 2 in contact with liquid crystal material 4. Further, on CF substrate 3 in a frame region, black matrix (BM) 6 is formed.

Further, in a pixel region that is a region where an image is displayed, alignment layers 9 to which alignment treatment is applied are formed on opposed surfaces of substrates 2 and 3, which are opposite to each other. In order to keep a predetermined gap between both substrates 2 and 3, pillar spacer 10 and seal material 5 are formed. In this gap, liquid crystal material 4 is encapsulated.

As a method for encapsulating the liquid crystal, there are a liquid crystal injecting method and a liquid crystal dropping method. In the liquid crystal injecting method, the seal material is completely cured before liquid crystal is injected. Meanwhile, in the liquid crystal dropping method, the seal material is not cured before liquid crystal is sealed, and the seal material is cured after the liquid crystal is dropped and sealed inside between two substrates 2 and 3.

Further, in the liquid crystal injecting method, the seal material is formed to enclose the pixel region, but since the liquid crystal needs to be injected, the seal material cannot be formed into a closed curve shape. Specifically, the seal material is in a shape in which a hole is provided in a part of the closed curve shape. In the liquid crystal dropping method, the seal material is formed into a closed curve shape so as to enclose the region including the pixel region. Therefore, in the case of the liquid crystal dropping method, the problems of contamination of liquid crystal material 4 by impurity ions, which are caused by contact of seal material 5 in an uncured or semi-cured state, arise remarkably and reduces the bonding strength of seal material 5. Further, with advances in the technology of the liquid crystal display panel, the structure, in which the frame region which does not contribute to image display, namely, the region between outer periphery 21 of the pixel region and the inner periphery 22 of the seal material is narrowed (frame narrowing structure), is being adopted. However, the frame narrowing structure further actualizes the above described problems.

The liquid crystal display panel and the method of manufacturing the same according to the present invention suppress the contamination of liquid crystal material 4 and the reduction in bonding strength of seal material 5 due to contact of the seal material 5 in an uncured or semi-cured state with liquid crystal material 4.

The liquid crystal display panel includes a configuration in which low wettability structures 11 for controlling liquid crystal diffusion are provided on surface 23 of interface of black matrix 6 of CF substrate 3 and on surface 23 of interface of TFT substrate 2 which is opposite to black matrix 6.

Hereinafter, a region of the above described liquid crystal display panel, which is shielded from light by black matrix 6, will be called a light-shielded region. Specifically, the light-shielded region is included in the above described frame region.

By making low wettability structure 11 on surface 23 of interface of substrates 2, 3 in the frame region as described above, the surface energy of the surface (with the averaged and uniform surface energy as a premise) is reduced. As a result, the contact angle of liquid crystal material 4 and the film surface increases, and wettability is reduced.

Concrete examples of low wettability structure 11 includes a liquid crystal repellent film that is a layer which repels the liquid crystal material, a structure in which a microscopic roughened surface shape is applied to the surface of interface of the substrate, and the like. As a liquid crystal repellent film, a silicon film, a fluorine film and the like are cited.

Figure 6:
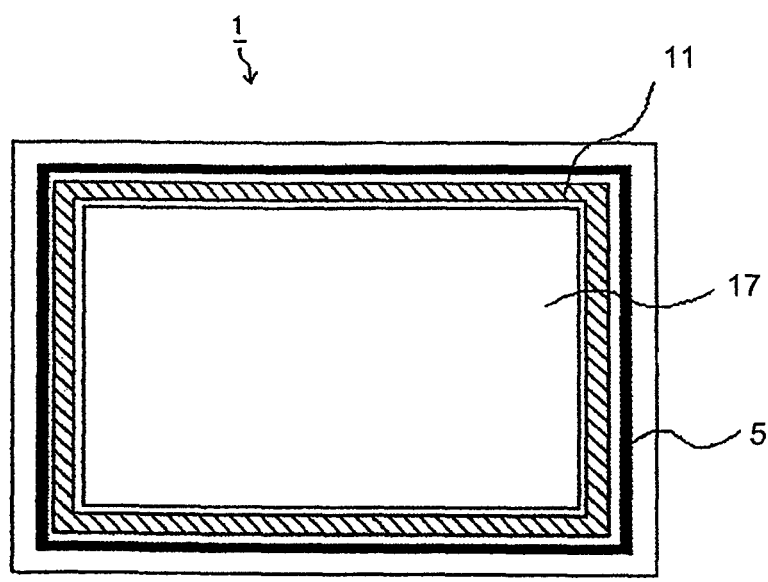
FIG. 6 is a schematic plane view of one example of the liquid crystal display panel according to the first exemplary embodiment.

FIG. 6 is a schematic plane view of the liquid crystal display panel as one example of the exemplary embodiment. In FIG. 6, the formation region of low wettability structure 11 is shown. Low wettability structure 11 is formed into a closed curved shape, between the respective pixel regions and the coating positions of the seal material (hereinafter, sometimes called "seal coating position") of TFT substrate 2 and CF substrate 3 of liquid crystal display panel 1. As one example, low wettability structure 11 is formed in the frame region enclosed by outer periphery 21 of the pixel region and inner periphery 22 of the seal material.

Figure 7:
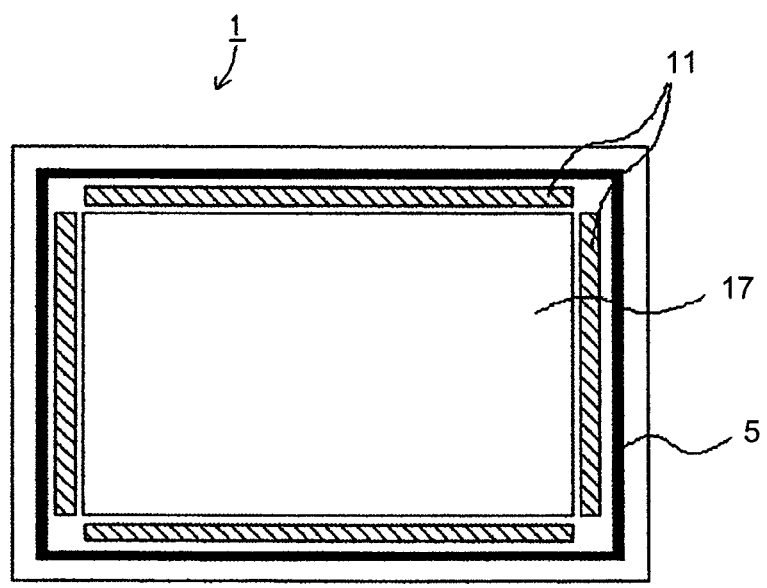
FIG. 7 is a schematic plane view of another example of the liquid crystal display panel according to the first embodiment.

Further, another example of the liquid crystal display panel in which, in order to control diffusion of the liquid crystal material more, low wettability structure 11, is formed is shown in FIG. 7. Low wettability structure 11 is formed between the respective pixel regions of TFT substrate 2 and CF substrate 3 of liquid crystal display panel 1 and the coating regions of the seal material. In FIG. 7, low wettability structure 11 is formed in the frame region except for four corners of the liquid crystal display panel. This is the mode which is made by giving consideration to the fact that when the liquid crystal material is dropped in the vicinity of the central portion of the liquid crystal display panel, the time taken for the liquid crystal material to reach the four corners of the panel is longer than the time taken for the liquid crystal material to reach the panel side portions.

Figure 8:
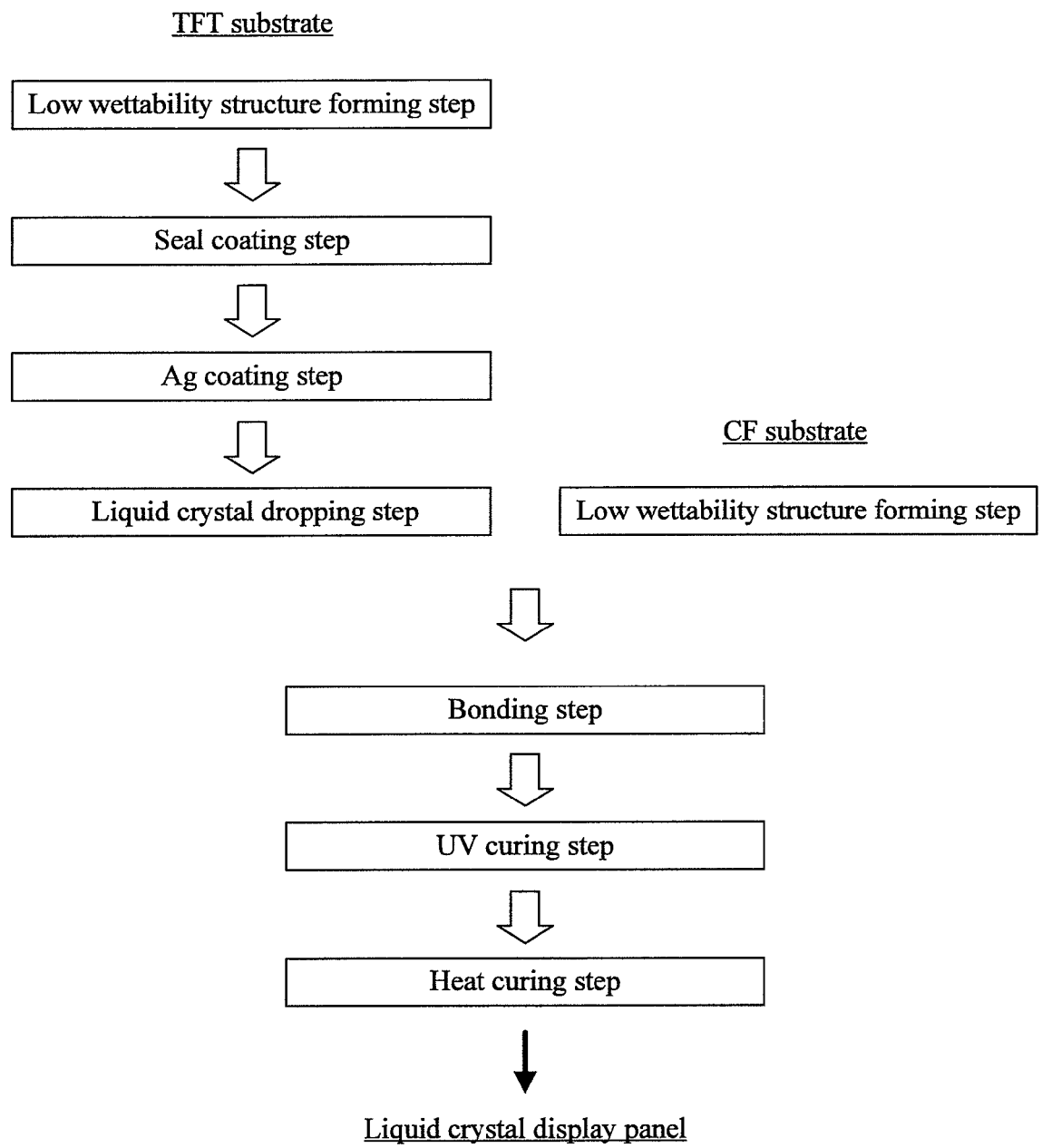
FIG. 8 is a flowchart showing a process for manufacturing a liquid crystal display panel according to an exemplary embodiment.

FIG. 8 shows a flowchart relating to the method of manufacturing the liquid crystal display panel according to an exemplary embodiment.

In a low wettability structure forming step, low wettability structure 11 is applied on surface 23 of interface of the black matrix formed on the CF substrate between the pixel region and the coating region of the seal material, that is, surface 23 of interface which is in contact with the liquid crystal material after the liquid crystal is encapsulated so that the contact angle increases. Thus, low wettability structure 11 in a predetermined range, which is set with consideration given to lead time until the start of the heat curing step after the end of the bonding step, is formed on the black matrix.

In the case of the CF substrate on which no black matrix is formed, low wettability structure 11 is formed on the surface of interface made up of the substrate which is in contact with the liquid crystal material between the pixel region and the seal coating position. Such a film surface may be an organic film or an inorganic film.

In the pixel region of the CF substrate, the pillar spacer for forming a predetermined gap between the substrates is formed in advance. In the case of using the CF substrate in which no pillar spacer is formed, an insulative spherical spacer such as a polymer bead and a silica bead may be disposed after the end of the low wettability structure forming step.

Meanwhile, in the TFT substrate, low wettability structure 11 is applied to the position opposite to low wettability structure 11 formed on the CF substrate as described above. More specifically, low wettability structure 11 is applied to the surface of interface (film surface) of the TFT substrate between the pixel region and the seal coating region.

For example, low wettability structure 11 is applied to the surface of interface of the film surface made of an inorganic substance such as SiNx used as a gate insulating film and Indium Tin Oxide (ITO) used as a pixel electrode, or an organic substance such as novolac which is higher in insulating properties than SiNx. In this manner, low wettability structure 11 in the predetermined range is also formed on the TFT substrate side similarly to the CF substrate.

FIG. 8 illustrates the case in which the low wettability structure forming step is carried out immediately after rubbing, cleaning, and drying as an example, but the timing of the low wettability structure forming step is not limited to this case. For example, the low wettability structure forming step may be provided before cleaning of the TFT substrate and the CF substrate. Alternatively, low wettability structure 11 may be formed during manufacture of the TFT substrate, for example, during the etching step for forming the insulating film.

Specifically, the low wettability structure forming step is carried out for both the TFT substrate and the CF substrate before the liquid crystal dropping step.

As formation of low wettability structure 11, formation of the liquid crystal repellant film which repels the liquid crystal material, formation of a microscopic roughened surface layer and the like are cited.

In a seal coating step, the seal material is coated onto a predetermined position of the TFT substrate as the outer peripheral (auxiliary) seal and the main seal respectively. Here, the seal material is coated so that the main seal is in the closed curve shape after a bonding step which will be described later.

In an Ag coating step, an Ag transfer is coated onto a predetermined position in a dotted form if it is necessary. This step is carried out in the case of manufacturing the TN mode liquid crystal display panel. Specifically, in the manufacture of the liquid crystal display panel having In Plane Switching (IPS) mode, this step is omitted.

In the liquid crystal dropping step, the liquid crystal material is dropped by a predetermined quantity onto the TFT substrate so as not to be in contact with the seal material. The liquid crystal material is dropped to a predetermined position inside the main seal in an optional form such as a matrix shape (number of dots in a matrix shape), a linear shape, and a radial shape.

Thereafter, in the bonding step, the TFT substrate and the CF substrate are opposite to each other are, brought into contact with each other and are pressurized. Thereby, the gap between the substrates is uniformly formed while the liquid crystal material is uniformly diffused into the pixel region and its peripheral portion. At this time, in order to form the gap uniformly in the pixel region, the diffusion speed of the liquid crystal material in the pixel region is preferably high. This is because when the diffusion speed of the liquid crystal material is made high, the liquid crystal material is uniformly diffused while the TFT substrate and the CF substrate are brought into contact with each other and pressurized, and uniformity of the gap in the pixel region is kept. When the diffusion speed of the liquid crystal material is low, the liquid crystal material in the center portion of the pixel region becomes thicker than the liquid crystal material in the peripheral portion of the pixel region, and uniformity of the gap is lost.

At the time of transfer of the substrate, which is performed before shifting to a UV curing step, in order to prevent misalignment in fitting of the bonded substrates, the seal material is preferably fastened temporary. As temporary fastening, UV temporary curing to several spots is preferably performed partially for the outer peripheral seal. At this time, the liquid crystal material quickly diffuses further in the pixel region with the lapse of time, and reaches the frame region (region where BM is formed) outside the pixel region. However, since the frame region includes low wettability structure 11, the diffusion speed of the liquid crystal material decreases. Accordingly, the liquid crystal material does not reach the seal material.

In this state, the UV curing step is carried out. In the UV curing step, a predetermined quantity of UV is irradiated, and the seal material is cured. At this time, the seal material is in a semi-cured state. By use of liquid crystal diffusion control, the seal material in the uncured state and the liquid crystal material can be prevented from being brought into contact with each other.

In a heat curing step, the seal material is heated at a predetermined temperature, and the seal material is completely cured. Thereby, the seal material has necessary bonding strength. During this step, diffusion of the liquid crystal material is suppressed due to low wettability structure 11. Therefore, the liquid crystal material is not in contact with the seal material. In this manner, the seal material in the semi-cured state and the liquid crystal material can be suppressed from being in contact with each other.

The viscosity of the liquid crystal material is reduced as it is heated. When heat curing of the seal material is completed, the seal material is diffused and filled into the entire region inside the main seal. Subsequently, the seal material and the liquid crystal material are in contact with each other, and in the vicinity of the black matrix, uniformity of the gap is also ensured.

For the liquid crystal display panel thus manufactured, ACF (Anisotropic Conductive Film) bonding, TCP (Tape Carrier Package) pressure-welding, and substrate pressure-welding are performed. Thereafter, a backlight source is attached to the liquid crystal display panel, and thereby, a liquid crystal display device is completed.

Thus, in the present invention, in the frame region between the pixel regions and the seal coating positions of TFT substrate 2 and CF substrate 3, the film surfaces of the substrate surfaces are made low wettability structures 11. Thereby, the surface energy of the film surface is reduced, and the diffusion speed of the liquid crystal material which passes the frame region is decreased. Accordingly, contact of the seal material in the uncured or semi-cured state and the liquid crystal material can be suppressed.

Low wettability structures 11 are formed outside of the pixel region. In order to increase adhesion of the seal material and substrates, low wettability structures 11 are preferably formed to extend to the coating positions of seal material 5. Further, with consideration given to the lead time from gap formation between the substrates to the seal material curing, the region, roughness and the like of low wettability structure 11 are appropriately set.

Depending on the case, alignment of the liquid crystal of the region where low wettability structure 11 is formed is disturbed, and a problem such as, for example, light leakage, sometimes occurs in the display state of the liquid crystal display panel. Therefore, low wettability structure 11 is preferably formed in only the light-shielded region. Further, in FIG. 5, an example having space between the black matrix and the seal material is shown, but as described above, black matrix 6 may be in contact with seal material 5.

In the exemplary embodiment, the low wettability structures for controlling diffusion of the liquid crystal material are formed on the black matrix of the CF substrate and the film surface of the TFT substrate which is opposite to it. Thereby, wettability to the liquid crystal material is reduced, and the liquid crystal diffusion speed can be decreased.

According to the liquid crystal display panel and the method of manufacturing the same according to the exemplary embodiment, the seal material in the uncured or semi-cured state can be suppressed from being in contact with the liquid crystal material, and display quality and reliability of the liquid crystal display panel can be improved. This is because contact of the seal material in the uncured or semi-cured state and the liquid crystal material can be suppressed by the low wettability structure.

Further, the space between the black matrix of the CF substrate and the TFT substrate does not need to be small, the required liquid crystal diffusion speed can be reduced without worsening uniformity of the gap in the vicinity of the black matrix. This becomes an effective means for a liquid crystal display panel that has a frame narrowing structure, or a structure that conforms to high-speed responsiveness, that is, a liquid crystal display panel of a design in which the seal material and the liquid crystal material are easily in contact with each other. As a result, a high-quality liquid crystal display panel with significantly reliability improved can be provided.

A Second Exemplary Embodiment

Next, a liquid crystal display panel according to a second exemplary embodiment will be described. In this liquid crystal display panel, a fluorine film which is a liquid crystal repellent film is formed in a thin film as low wettability structure 11 which is located on surface 23 of interface of black matrix 5 and on surface 23 of interface of TFT substrate 2 opposite to it, in the liquid crystal display panel of the first exemplary embodiment shown in FIG. 5. The fluorine film is formed by coating a fluorine resin such as ethylene tetrafluoride, or applying fluoridation treatment.

In this manner, the liquid crystal repellent film which is a fluorine film is formed on surface 23 of interface of black matrix 6 of CF substrate 3 and on the film surface 23 of interface of TFT substrate 2 which is opposite to it. Due to the liquid crystal repellency of the liquid crystal repellent film, the diffusion speed of liquid crystal material 4 which diffuses in the frame region is decreased.

Here, if the thickness of the fluorine film is 10 nm or more, there is substantially no change in the contact angle of the fluorine film to liquid crystal material 4. Accordingly, the film thickness of the fluorine film is 10 to 100 nm.

Figure 9:
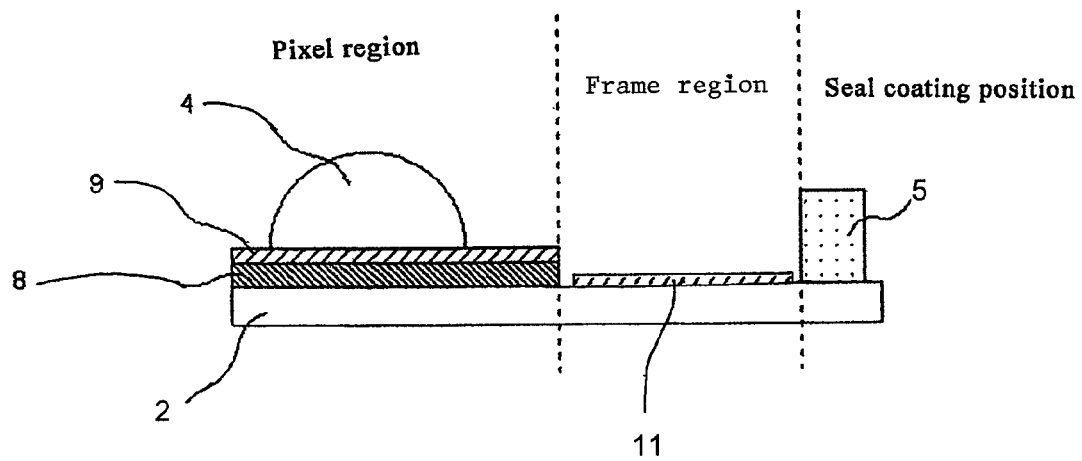
FIG. 9 is a schematic view of a TFT substrate in which a low wettability structure is formed between a pixel region and a seal coating position.

FIG. 9 is a schematic view of TFT substrate 2 in which low wettability structure 11 is formed between the pixel region and the seal coating position.

FIG. 9 shows the state in which liquid crystal material 4 is dropped in a matrix shape (one drop in this case). In FIG. 9, only one drop of liquid crystal material 4 is shown.

A Third Exemplary Embodiment

Next, a liquid crystal display panel according to a third exemplary embodiment will be described. In this liquid crystal display panel, a silicon film which is a liquid crystal repellent film is formed as low wettability structures 11 located on the surface 23 of interface of the black matrix and on surface 23 of interface of the TFT which is opposite to it, in the liquid crystal display panel of the first exemplary embodiment shown in FIG. 5. The silicon film is formed as a thin film by locally applying siliconizing treatment.

In this manner, the liquid crystal repellent film which is a silicon film is formed on surface 23 of interface of black matrix 6 of CF substrate 3 and on film surface 23 of interface of TFT substrate 2 which is opposite to it. The liquid crystal repellent film has liquid crystal repellency, and decreases the diffusion speed of liquid crystal material 4 which diffuses in the frame region.

Figure 10A:
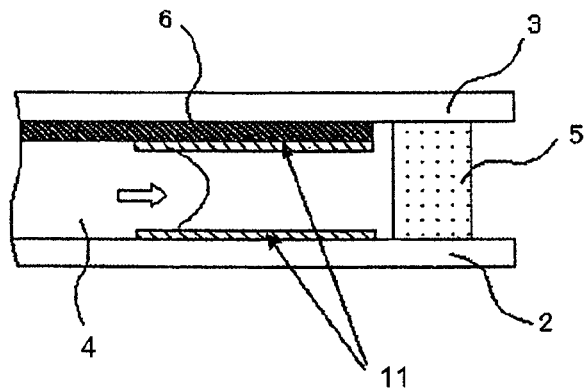
FIG. 10A is a conceptual diagram showing diffusion of a liquid crystal material in a substrate in which the low wettability structure is formed.
Figure 10B:
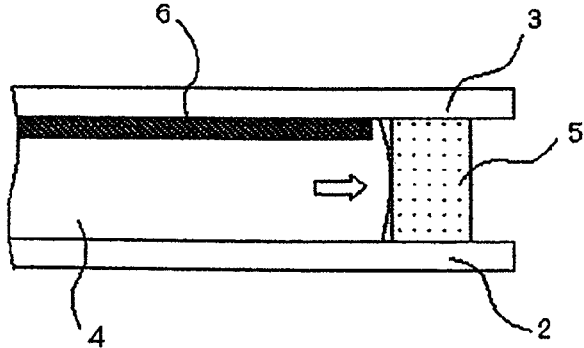
FIG. 10B is a conceptual diagram showing diffusion of the liquid crystal material in the substrate in which the low wettability structure is not formed.

The silicon film is formed with a film thickness of 10 to 100 nm. FIGS. 10A and 10B conceptually show the liquid crystal diffusion control effect of the low wettability structure. FIG. 10B shows the state of the diffusion of the liquid crystal material at the time of bonding the substrates, for the liquid crystal display panel in which the low wettability structure is not formed. In this case, when CF substrate 3 and TFT substrate 2 are in contact with each other and pressurized, liquid crystal material 4 rapidly diffuses from the pixel region to the frame region. As a result, liquid crystal material 4 which has diffused is in contact with seal material 5 in an uncured state before UV curing.

Meanwhile, FIG. 10A shows the state of the diffusion of the liquid crystal material at the time of bonding the substrates, for the liquid crystal display panel relating to the exemplary embodiment. Even when CF substrate 3 and TFT substrate 2 are in contact with each other and pressurized, the diffusion speed of the liquid crystal significantly decreases in the frame region. This is because the liquid crystal repellent treatment which increases the contact angle to liquid crystal material 4 is applied to the frame region.

As a result of the above, the timing in which liquid crystal material 4 contacts seal material 5 in the uncured state before UV curing is delayed, and contact of seal material 5 in the uncured state and liquid crystal material 4 can be suppressed.

When the above described contact angle is measured based on JIS R 3257 (1999) "Testing method of wettability of glass substrate surface" by using the liquid crystal material which is encapsulated in the liquid crystal display panel (for example, with use of Contact Angle Meter DM300 made by Kyowa Interface Science Co., Ltd.), the degree of the liquid crystal repellency can be easily confirmed. The liquid crystal repellency can be reproduced even if the liquid crystal display panel is decomposed, the attached liquid crystal material is removed with acetone and IPA, and thereafter, the liquid crystal repellency is measured again, as long as the liquid crystal repellent film is formed. By forming the liquid crystal repellent film, the surface energy of the liquid crystal repellent films attached to the above described black matrix of the CF substrate and the above described film surface of the TFT substrate which is opposite to it becomes lower than the surface energy on the alignment layer surface of the pixel region. This can be determined by measuring the contact angle of the liquid crystal repellent film and the contact angle on the alignment layer surface of the pixel region, and the contact angle of the liquid crystal repellent film to the liquid crystal material becomes larger than the contact angle on the alignment layer surface of the pixel region.

Figure 11:
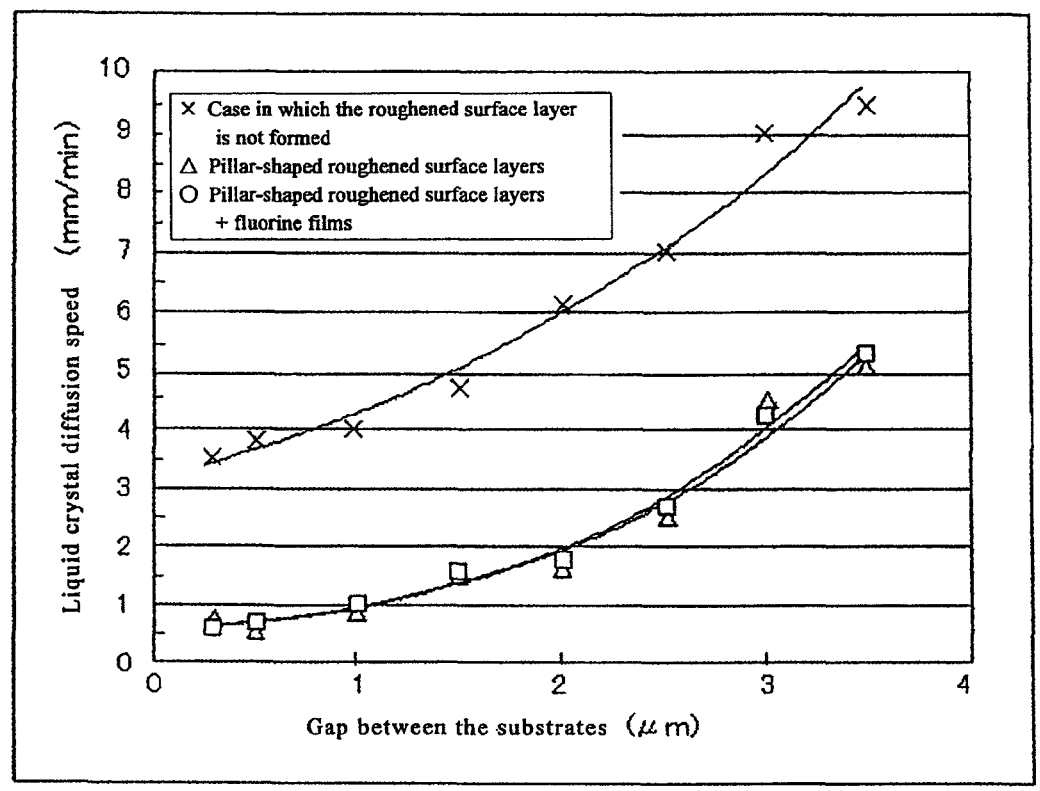
FIG. 11 is a diagram showing the relationship between the diffusion speed of the liquid crystal and the gap in a frame region which is a region where a black matrix is formed.

Here, FIG. 11 shows the relationship between the liquid crystal diffusion speed and the gap in the frame region, in the liquid crystal display panel of the exemplary embodiment. Generally in the liquid crystal display panel, the gap in the frame region, that is, the clearance distance of the black matrix and the TFT substrate is larger than the clearance (gap) in the pixel region. As one indication of this, the fact that the color layer, which is to become a CF substrate, is not formed in the frame region, is cited. From FIG. 11, it is found that as the clearance distance between the black matrix and the TFT substrate becomes shorter, the liquid crystal diffusion speed further decreases.

However, when liquid crystal repellent treatment is not applied to the frame region (crosses in the drawing), even if the clearance distance between the black matrix and the TFT substrate is made short, the decrease in the diffusion speed is limited.

Accordingly, the liquid crystal repellent film such as a fluorine film and a silicon film is preferably formed with a thin film on the substrate surface in the frame region (triangles and squares in the drawing). Thereby, the diffusion speed in the frame region can be decreased without making the clearance distance between the black matrix and the TFT substrate extremely short. The kind of the liquid crystal repellent film can be selected in accordance with predetermined gap width or black matrix width. As a result, the necessary liquid crystal diffusion speed can be obtained without worsening the gap uniformity in the vicinity of the black matrix.

The contact angle formed by the fluorine film or the silicon film and the liquid crystal material is a substantially constant value and about 10 nm as described above, but in this case, it is set at 100 nm with consideration given to the occurrence rate of a pin hole which occurs due to a portion that is left uncoated.

The width of the liquid crystal repellent film can be set within the allowable range of the width of the black matrix located between the pixel region and the seal coating position. Further, the width of the liquid crystal repellent film is preferably set with consideration given to the lead time from the time directly after the end of the bonding step until the time directly before the start of the heat curing step. For example, when the lead time from the time directly after the end of the bonding step until the time directly before the start of the heat curing step is within 2.5 minutes, in order to manufacture the liquid crystal display panel with the distance between the black matrix and the TFT substrate being 2.0 µm, the liquid crystal repellent film width is set at 4.5 mm or more in consideration of unevenness. This avoids contact of the uncured seal material and the liquid crystal material.

In the above described embodiment, the configuration in which the liquid crystal repellent treatment for controlling liquid crystal diffusion is applied to both the surfaces of the CF substrate and the TFT substrate is cited as an example. However, if the configuration in which the liquid crystal repellent treatment is applied to either the CF substrate or the TFT substrate is adopted, the diffusion speed of the liquid crystal material can be decreased. Therefore, the time when the uncured or semi-cured seal material and the liquid crystal material are in contact with each other can be delayed, and contamination of the liquid crystal material can be suppressed.

A Fourth Exemplary Embodiment

Next, a liquid crystal display panel according to a fourth exemplary embodiment will be described.

In liquid crystal display panel 1, roughened surface structures with microscopic recesses and projections are formed on the substrate surface as low wettability structures 11 which are located on the surface on interface of the film configuring black matrix 6 and on the surface on interface of the TFT substrate which is opposite to it, in the liquid crystal display panel of the first exemplary embodiment shown in FIG. 5. As the surface on interface of the TFT substrate on which the roughened surface structure is formed, for example, a desired position on the surface of the gate/drain/interlayer insulating film/protection film may be selected.

The roughened surface structure with microscopic recesses and projections shows high liquid crystal repellency. The theory of Wenzel discusses the relationship of the film surface roughness and wettability, and suggests that when the film surface is roughened, wettability is reduced. Reduction in wettability to the liquid crystal material by roughening the film surface is due to an increase in the area where the liquid crystal material and the film surface are in contact with each other (see "Physical Chemistry of Surfaces (John Wiley & Sons, New York), written by A. W. Adamson).

In the exemplary embodiment, the surface energy of the substrate surface in the frame region is reduced by roughening the film surface. Wettability to the liquid crystal material is reduced, and the contact angle to the liquid crystal material is increased. Thereby, the diffusion speed of the liquid crystal at the time of panel bonding is decreased.

The roughened surface structure with microscopic recesses and projections is preferably formed in a closed curve shape.

Figure 12A:
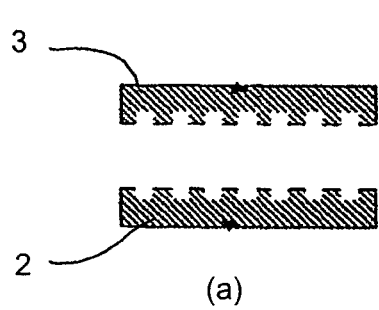
FIG. 12A is a schematic view showing a pillar-shaped roughened surface structure formed on the substrates.
Figure 12A:
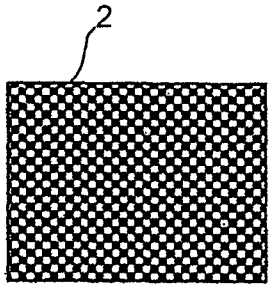
Figure 12B:
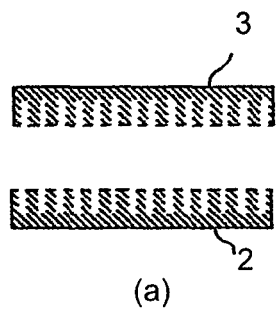
FIG. 12B is a schematic view showing a comb-shaped roughened surface structure formed on the substrates.
Figure 12B:
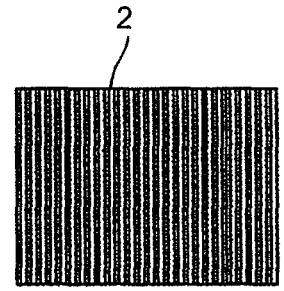
Figure 12C:
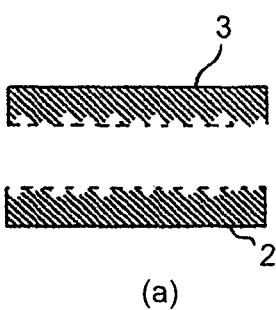
FIG. 12C is a schematic view showing a hole-shaped roughened surface structure formed on the substrates.
Figure 12C:
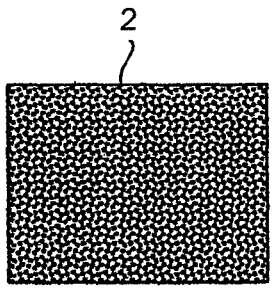

FIGS. 12A to 12C show examples of the shape of the roughened surface structure. FIGS. 12A(a), 12B(a) and 12C(a) show schematic sectional views of the frame regions of the liquid crystal display panels, and FIGS. 12A(b), 12B(b) and 12C(b) are schematic plane views when the liquid crystal display panels are viewed from the front direction. The roughened surface structures in a pillar shape, a comb shape, a hole shape and the like are formed on the foremost surfaces of the black matrix of the CF substrate and the TFT substrate, namely, the film surfaces that are to be in contact with the liquid crystal material. The roughened surface structure is formed regularly or irregularly.

The pillar-shaped roughened surface structure is the structure in which square microscopic recesses and projections are regularly formed (See FIG. 12A). The comb-shaped roughened surface structure is the structure in which rectangular microscopic recesses and projections are regularly formed (See FIG. 12B). Further, the hole-shaped roughened surface structure is the structure in which a number of microscopic holes are irregularly formed (See FIG. 12C).

By forming the roughened surface structure which increases the surface area of the interface of the liquid crystal material and the substrate like this, the diffusion speed of the liquid crystal material which passes the black matrix surface decreases. This is because when surface area of the interface is increased, the surface energy is reduced as compared with when it is a smooth surface, and the contact angle with respect to the liquid crystal material increases.

Further, in order to increase the contact angle, the surface area of the interface is enlarged by increasing the surface roughness of the above described interface. The recesses and projections of the roughened surface structure may be uniform, or may be of an uneven height.

Figure 13:
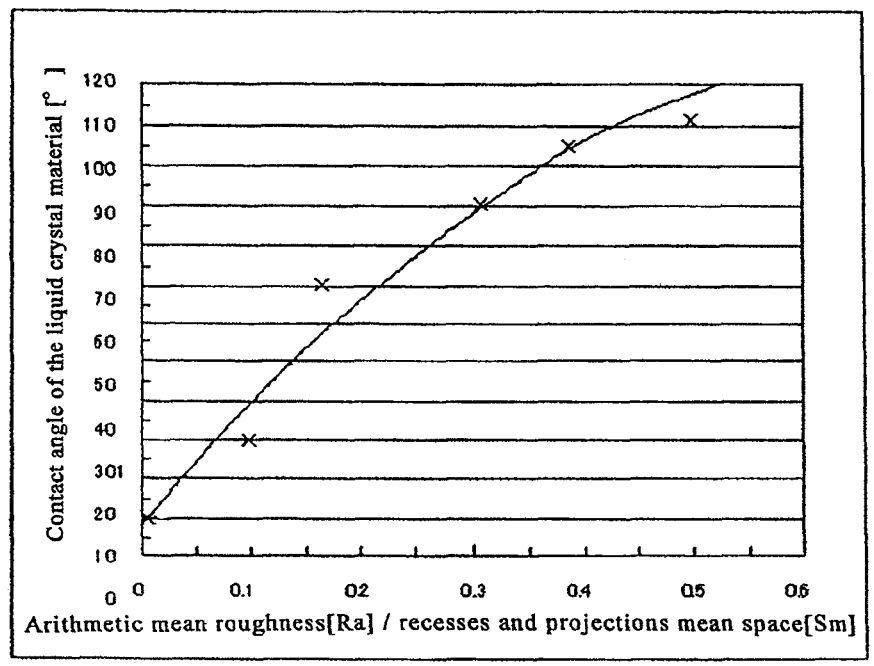
FIG. 13 is a diagram showing the relationship between the surface roughness of the roughened surface structure and a contact angle, in the contact interface of the liquid crystal material and the roughened surface structure.

FIG. 13 shows the relationship between the surface roughness of the interface with the liquid crystal material and the contact angle in the case of the pillar-shaped roughened surface structure. Here, as the parameter showing the surface roughness, "arithmetic mean roughness [Ra]/recesses and projections mean space [Sm]" is calculated (Ra and Sm are based on JIS B0601-1994). When the value is large, it means that the surface roughness of the roughened surface layer is large. Specifically, it indicates that in the formation region of the roughened surface layer, the surface area of the portion, which the liquid crystal material contacts, is large.

Referring to FIG. 13, it was found that as the surface roughness of the roughened surface layer with the microscopic recesses and projections per unit area becomes larger, the contact angle with respect to the liquid crystal material increases. In the exemplary embodiment, the roughened surface layer is formed on the ITO film surface which is an inorganic film.

Further, when the roughened surface structure is formed on the organic film, it was also confirmed that as the surface roughness of the roughened surface layer per unit area becomes larger, the contact angle with respect to the liquid crystal material increases.

The roughness of the microscopic structure is much smaller than the drip amount of one drop (diameter of about 8 mm) of the liquid crystal material. As methods of forming the roughened surface layer, focused ion beam (FIB), femtosecond laser, etching, plasma ashing and the like are cited.

The microscopic structures in a pillar shape and in a comb shape can be formed by etching the substrate so that these structures have a depth within the range of 0.1 to 10 μm in the vertical direction. For example, in the case of the pillar-shaped structure, etching is performed in the vertical direction to a depth of 0.5 μm so as to form a square pillar with each side having a depth of 0.5 μm. Thereby, the roughened surface layers of the pillar shapes can be regularly formed at pitches of 1 μm.

In the case of the pillar-shaped structure, the relationship between the width of the bottom side of the pillar and the height of the pillar is preferably set so that [height]/[width of the bottom side]≥1 or more. In the case of the comb-shaped structure, etching is performed so as to form the rectangular combs each having a depth of 0.8 μm, a width of 0.5 μm and a length of 5 μm. Thereby, the comb-shaped roughened surface layers are regularly formed at pitches of 1 μm. Thus, in the comb-shaped structure, the relationship between the width of the bottom side at a short side of the comb and the height of the comb is also preferably set so that [height]/[width of the bottom side]≥1 or more.

Further, the hole-shaped microscopic structure is formed by forming a number of microscopic holes in the black matrix surface, and the film surface of the TFT substrate opposite to it is formed by ashing. The hole diameter is preferably 100 nm or less, and a hole distribution from a macro hole to a micro hole may be included. Thereby, in the region where the roughened surface layer is formed, the surface area of the substrate increases.

As described above, by forming a number of projected structures deep in the vertical direction as pillar-shaped and comb-shaped microscopic structures, the effect of reducing surface energy can be further increased. Further, by forming a number of microscopic holes as the low wettability structure, the effect of reducing surface energy can be further increased.

A Fifth Exemplary Embodiment

Next, a liquid crystal display panel according to a fifth exemplary embodiment will be described. In liquid crystal display panel 1, a roughened surface layer and a liquid crystal repellent film are sequentially formed as low wettability structure 11 in the liquid crystal display panel of the first exemplary embodiment shown in FIG. 5. Specifically, the roughened surface layer is formed on surface 23 of interface of black matrix 6 and on surface 23 of interface of TFT substrate 2 which is opposite to it. Further, the liquid crystal repellent film is formed on surface 23 of interface of the roughened surface layer.

By forming the liquid crystal repellent film on the roughened surfaces of TFT substrate 2 and on CF substrate 3, the surface roughness of the liquid crystal repellent film is increased. Thereby, wettability to the liquid crystal material is further reduced by the synergism of the liquid crystal repellency of the liquid crystal repellent film and the surface roughness. Accordingly, the diffusion speed of the liquid crystal material which diffuses on the black matrix surface is further decreased.

Thus, the diffusion speed of the liquid crystal material is further suppressed. Therefore, the liquid crystal display panel according to this exemplary embodiment is sufficiently available as a liquid crystal display panel of the frame narrowing structure, a liquid crystal display panel that uses a liquid crystal material with low viscosity or the like.

As liquid crystal repellent film, the films such as fluorine film, silicon film and the like are preferable. Further, it has been confirmed that with the liquid crystal repellent film having a thickness of 10 nm or more, there is substantially no change in the contact angle of the liquid crystal material on the liquid crystal repellent film. Further, with the liquid crystal repellent film having a thickness 100 nm or more, a pin hole due to repelling and a uncoated portion are not formed. Therefore, the liquid crystal repellent film can be stably formed.

The diffusion control effect of the liquid crystal material having the roughened surface layer is similar to the cases shown in FIG. 10A. When the roughened surface layer is not formed on the substrates, the liquid crystal material rapidly diffuses from the pixel region to the frame region (See FIG. 10B). As a result, the diffused liquid crystal material contacts the seal material in an uncured state.

On the other hand, when the roughened surface layers are formed on the substrates in the frame region, the diffusion speed of the liquid crystal material significantly decreases. This is because the low wettability structure is made up of the roughened surface layers having surfaces on which the contact angles of the liquid crystal material are larger than those of the liquid crystal material on substrates in the frame regions. As a result, the timing in which the liquid crystal material contacts the seal material in the uncured state is delayed, and contact of the seal material in the uncured state with the liquid crystal material can be suppressed.

By measuring the contact angle of the liquid crystal material which is encapsulated in the liquid crystal display panel based on JIS R 3257 (1999) according to the "Testing method of wettability of glass substrate surface" (for example, with use of Contact Angle Meter DM 300 made by Kyowa Interface Science Co., Ltd.), the degree of the liquid crystal repellency can be easily confirmed.

As long as the roughened surface layer is formed, the liquid crystal repellency is kept even if the attached liquid crystal material is removed with acetone and IPA after the liquid crystal display panel is decomposed.

The contact angle of the liquid crystal material on the surface of the roughened surface layer is larger than the contact angle of the liquid crystal material on the surface of the alignment layer in the pixel region. This is because the surface roughness of the roughened surface layer is larger than the surface roughness of the surfaces of the alignment layers, which are the surfaces of the CF substrate and the TFT substrate in the pixel region.

Figure 14:
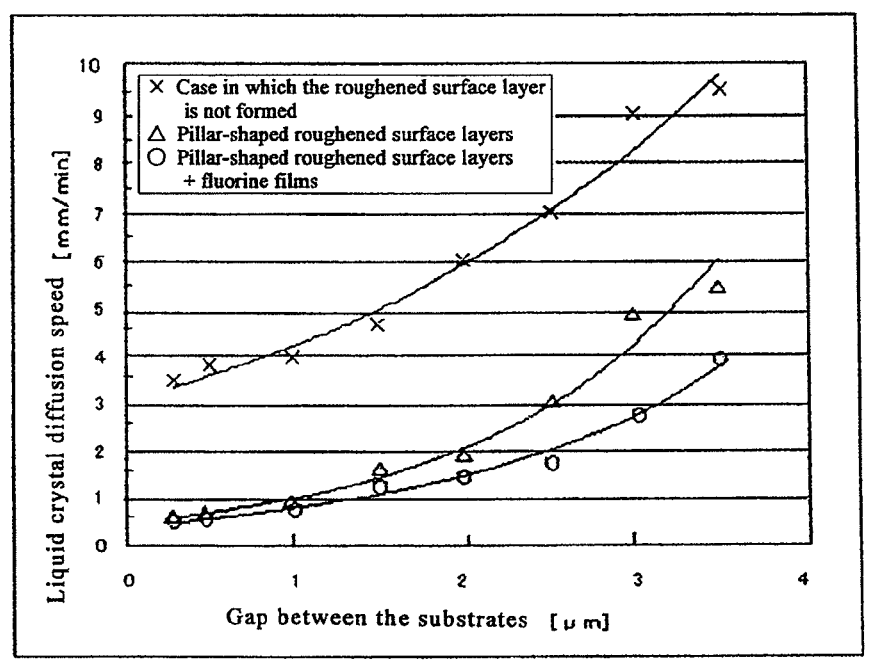
FIG. 14 is a diagram showing the correlation of the liquid crystal diffusion speed and the gap in the frame region.

Here, FIG. 14 shows the relationship of the liquid crystal diffusion speed in the frame region to the gap between substrates in the exemplary embodiment. The crosses in the drawing indicate the result of the case in which the roughened surface layer is not formed, the triangles indicate the result of the case in which only the pillar-shaped roughened surface layers which are square microscopic recesses and projections are formed, and circles indicate the result of the case in which a fluorine film is further formed on the pillar-shaped roughened surface layers.

Generally in the liquid crystal display panel, the gap between the substrates in the frame region, that is, the clearance between the black matrix and the TFT substrate is larger than the gap in the pixel region. Referring to FIG. 14, it was found out that as the gap in the pixel region becomes smaller, the liquid crystal diffusion speed decreases. When the roughened surface layer is not formed in the frame region, a decrease in the diffusion speed is limited even if the gap between the black matrix and the TFT substrate is made significantly short. If the gap is made further shorter, there arises the problem that the black matrix and the TFT substrate will be partially in contact with each other. As a result, there arises a new problem of peripheral unevenness.

When the pillar-shaped roughened surface layers are formed on the substrates, or when the fluorine film is formed further on the pillar-shaped roughened surface layer, the gap between the black matrix and the TFT substrate does not need to be extremely short. Thereby, the surface roughness of the roughened surface layer can be set in accordance with the predetermined gap in the pixel region or black matrix width. As a result, the liquid crystal diffusion speed can be decreased without worsening the gap uniformity in the vicinity of the black matrix.

The film thickness of the liquid crystal repellent film is set at 100 nm. The contact angle formed by the liquid crystal repellent film and the liquid crystal material becomes a substantially constant value in the range of the liquid crystal repellent film of about 10 nm or more. In the exemplary embodiment, in order to suppress the occurrence rate of a pin hole which occurs due to the portion which is left uncoated, the width of the liquid crystal repellent film is set at 100 nm.

The forming region of the roughened surface layer is defined by the region of the black matrix which is formed in the region between the pixel region and the seal coating position. The forming region of the roughened surface layer is set by considering the lead time from the time that the bonding step ends to the time when the heat curing step starts.

For example, when the liquid crystal display panel with the gap between the black matrix and the TFT substrate being 2.0 µm is manufactured under the condition in which the lead time is within 2.5 minutes, the roughened surface layer width is preferably 4.8 mm or more from the result of FIG. 14. In doing so, the uncured seal material and the liquid crystal material are never in contact with each other.

In each of the above described exemplary embodiments, the configuration in which the low wettability structure for controlling liquid crystal diffusion is formed on surface 23 of interface of the CF substrate and on surface 23 of interface of the TFT substrate is shown as an example. However, the low wettability structure may be formed on either the CF substrate or the TFT substrate or both substrates. In this case, the diffusion speed of the liquid crystal material also can be decreased, and therefore, contamination of the liquid crystal material can be suppressed.

In the following examples, concrete examples of the method of manufacturing the liquid crystal display panel of the present invention will be described, but the present invention is not limited to the following examples.

A First Example

First, as a first example, the method of manufacturing an IPS mode liquid crystal display panel, which is the liquid crystal display panel in which a fluorine film that is a liquid crystal repellent film is formed will be described.

In the step for forming a low wettability structure for the CF substrate, fluoridation treatment was applied to the surface of interface of the black matrix between the pixel region and the seal coating position (frame region). More specifically, after fluorine molecules were locally deposited on the CF substrate using the film deposition device, polymerization treatment was performed. Thereby, fluorine film having a film thickness of about 100 nm was formed in a closed curve shape.

Further, in the manufacture of the liquid crystal display panel in which the clearance distance of the black matrix and the TFT substrate was 2.1 µm, the fluorine film width was made 4 mm in order to make the lead time from the time immediately after the end of the bonding step until the time immediately before the start of the heat curing step be within two minutes. The target value of the gap in the pixel region was 2.0 µm.

Meanwhile, in the step for forming a low wettability structure for the TFT substrate, similar fluoridation treatment was performed for the SiNx film surface of the TFT substrate, which is the film surface opposite to the above described fluorine film of the CF substrate. In this manner, the fluorine film having a thickness of about 100 nm was also formed into a closed curve shape with a width of 4 m on the TFT substrate similarly to the CF substrate.

Next, in the seal coating step, a hybrid type seal material was coated onto the predetermined position so as to enclose the pixel region. The seal materials were coated into the closed curve shapes respectively as the outer periphery (auxiliary) seal and as the main seal.

Next, in the liquid crystal dropping step, the liquid crystal material was dropped in a matrix shape into a region enclosed by the above described main seal by a predetermined drip amount. Thereafter, in the bonding step, both the above described substrates are brought into contact with each other and are pressed, whereby the gap between the substrates was uniformly formed while the liquid crystal material was uniformly diffused to the entire pixel region between the substrates.

Subsequently, at the time of transfer for the next step, UV curing was partially performed at several spots so that the seal material is temporary fastened. In the next UV curing step, the seal material was cured by a UV irradiation amount of 3000 mJ. At this time, it was confirmed that due to the existence of the above described fluorine film, the seal material in the uncured state and the liquid crystal material were not in contact with each other.

Next, in the heat curing step, the seal material was completely cured by being heated at 120° C. for an hour. At the time when heating was started, it was confirmed that due to the existence of the above described fluorine film, the seal material in the semi-cured state and the liquid crystal material were not in contact with each other.

Thereafter, when heat curing of the seal material was completed, the liquid crystal material diffused to and was filled in the entire region inside the main seal. Subsequently, the seal material and the liquid crystal material were in contact with each other, and the gap was also formed in the vicinity of the black matrix.

After heat curing, the gap in the pixel region of the liquid crystal display panel, and in the vicinity of the black matrix was measured. As a result, it was recognized that a uniform gap was obtained in the entire pixel region.

A high temperature/high humidity test was carried out for the liquid crystal display panel of the example thus manufactured. As a result of the drive test that was carried out for 1500 hours in an environment with temperature of 60° C. and a humidity of 60%, occurrence of a stain, unevenness, and seal removal was not recognized in the seal peripheral portion of the liquid crystal display panel. Specifically, the liquid crystal display panel was in favorable display state.

For comparison, the liquid crystal display panel in which the liquid crystal repellent film was not formed was produced, and a similar test was performed. At the time when the drive test reached 1000 hours, occurrence of a stain in the seal peripheral portion was recognized.

A Second Example

Next, as a second example, the method of manufacturing a TN mode liquid crystal display panel, which is the liquid crystal display panel in which a fluorine film is formed as a liquid crystal repellent film, will be described.

In the step for forming a low wettability structure for the CF substrate, fluoridation treatment was applied onto the surface of interface of the black matrix of the frame region. More specifically, after fluorine molecules were locally deposited on the CF substrate using the film deposition device, polymerization treatment was performed, whereby fluoridation treatment was carried out. Thereby, the fluorine film having a thickness of about 100 nm was formed into a closed curve shape.

Further, in the manufacture of the liquid crystal display panel in which the clearance between the black matrix and the TFT substrate was 2.3 µm, the fluorine film width was made 4.5 mm, in order to make the lead time from the time immediately after the end of the bonding step until the time immediately before the start of the heat curing step be within two minutes. The target value of the gap between the substrates in the pixel region was 2.2 µm.

Meanwhile, in the step for forming a low wettability structure for the TFT substrate, similar fluoridation treatment was performed for the SiNx film surface of the TFT substrate in the frame region. In this manner, the fluorine film having a thickness of about 100 nm was also formed into a closed curve shape with a width of 4.5 mm on the TFT substrate side similarly to the CF substrate.

Next, in the seal coating step, a hybrid type seal material was coated onto the predetermined position so as to enclose the pixel region. The seal materials were coated into the closed curve shapes respectively as the outer periphery (auxiliary) seal and as the main seal.

Next, in the Ag coating step, an Ag-transfer was dropped in a matrix shape into the predetermined region outside the above described main seal. Next, in the liquid crystal drop step, the liquid crystal material was dropped in a dotted shape into the predetermined region inside the above described main seal by the predetermined drip amount.

Thereafter, in the bonding step, both the above described substrates are brought into contact with each other and pressurized, whereby the gap between the substrates was uniformly formed while the liquid crystal material was uniformly diffused to the entire pixel region between the substrates. Subsequently, at the time of transfer for the next step, UV curing was partially performed at several spots so that the seal material is temporary fastened.

Next, in the UV curing step, the seal material was cured by a UV irradiation amount of 3000 mJ. At this time, it was confirmed that due to the existence of the above described fluorine film, the seal material in the uncured state and the liquid crystal material were not in contact with each other. Next, in the heat curing step, the seal material was completely cured by being heated at 120° C. for an hour. At the time when heating was started, it was confirmed that due to the existence of the above described fluorine film, the seal material in the semi-cured state and the liquid crystal material were not in contact with each other. Thereafter, when heat curing of the seal material was completed, the liquid crystal material diffused to and was filled in the entire region inside the main seal. Subsequently, the seal material and the liquid crystal material were in contact with each other, and a gap was also formed in the vicinity of the black matrix.

After completion of heat curing, the gap was measured in the pixel region of the liquid crystal display panel and in the vicinity of the black matrix. As a result, it was recognized that a uniform gap was obtained in the entire pixel region.

A high temperature/high humidity test was carried out for the liquid crystal display panel of the example thus manufactured. As a result of the drive test that was carried out for 1500 hours in an environment having a temperature of 60° C. and a humidity of 60%, occurrence of a stain, unevenness, and seal removal in the seal peripheral portion of the liquid crystal display panel was not observed. Specifically, the liquid crystal display panel was in a favorable display state.

For comparison, the liquid crystal display panel in which the liquid crystal repellent film was not formed was produced, and a similar test was performed. At the time when the drive test reached 1000 hours, it was recognized that a stain occurred in the seal peripheral portion and a part of the seal material was removed.

A Third Example

Next, as a third example, a method of manufacturing an IPS mode liquid crystal display panel, which is the liquid crystal display panel in which a silicon film that is a liquid crystal repellent film is formed will be described.

In the step for forming a low wettability structure for the CF substrate, siliconizing treatment was applied to surface 23 of interface of the black matrix between the pixel region and the seal coating position. Thereby, the silicon film having a thickness of about 100 nm was formed into a closed curve shape. Further, in the manufacture of the liquid crystal display panel in which the clearance distance of the black matrix and the TFT substrate was 2.1 μm, the width of the silicon film was made 4 mm, in order to make the lead time from the time immediately after the end of the bonding step until the time immediately before the start of the heat curing step be within two minutes. The target value of the gap between the substrates in the pixel region was 2.0 μm.

Meanwhile, in the step for forming a low wettability structure for the TFT substrate, similar siliconizing treatment was performed for the surface opposite to the above described silicon film of the CF substrate, that is, the surface of interface of the TFT substrate in the frame region. In this manner, on the TFT substrate side, the silicon film having a thickness of about 100 nm was also formed into a closed curve shape with a width of 4 mm similarly to the CF substrate.

Next, in the seal coating step, the above described hybrid type seal material was coated onto the predetermined region so as to enclose the pixel region. The seal materials were coated into the closed curve shapes respectively as the outer periphery (auxiliary) seal and as the main seal.

Next, in the liquid crystal dropping step, the liquid crystal material was dropped in a matrix shape into the region closed by the above described main seal by a predetermined drip amount.

Thereafter, in the bonding step, both the above described substrates are brought into contact with each other and pressurized, whereby the liquid crystal material was uniformly diffused to the entire pixel region between the substrates. Thus, the gap between the substrates was uniformly formed.

At the time of transfer for the next step, UV curing was partially performed at several spots so that the seal material is temporary fastened. Next, in the UV curing step, the seal material was cured by a UV irradiation amount of 3000 mJ. At this time, it was confirmed that due to the existence of the above described silicon film, the seal material in the uncured state and the liquid crystal material were not in contact with each other.

Next, in the heat curing step, the seal material was completely cured by being heated at 120° C. for an hour. At the time when heating was started, it was recognized that the seal material in the semi-cured state and the liquid crystal material were not in contact with each other.

Thereafter, when heat curing of the seal material was completed, the liquid crystal material diffused and was filled into the entire region inside the main seal. Subsequently, the seal material and the liquid crystal material were in contact with each other, and a gap was also formed in the vicinity of the black matrix.

After the completion of heat curing, the gap in the pixel region of the liquid crystal display panel and in the vicinity of the black matrix was measured. As a result, it was recognized that a uniform gap was obtained in the entire pixel region.

A high temperature/high humidity test was carried out for the liquid crystal display panel of the example thus manufactured. As a result of the drive test that was carried out for 1500 hours in an environment having a temperature of 60° C. and a humidity of 60%, occurrence of a stain, unevenness, and seal removal was not observed in the seal peripheral portion of the liquid crystal display panel. Specifically, the liquid crystal display panel was in a favorable display state.

For comparison, the liquid crystal display panel in which the liquid crystal repellent film was not formed was produced, and a similar test was performed. At the time when the drive test reached 1000 hours, occurrence of a stain in the seal peripheral portion was recognized.

A Fourth Example

Next, as a fourth example, a method of manufacturing an IPS mode liquid crystal display panel, which is the liquid crystal display panel according to the fourth exemplary embodiment of the present invention will be described.

In the step for forming a low wettability structure the CF substrate, micromachining was applied to the surface of interface of the black matrix in the frame region using a focused ion beam (FIB) device. Subsequently, the pillar-shaped roughened surface layers on which pillars are formed at pitches of 1 μm ([Ra]/[Sm]=0.25) were formed into a closed curve shape so as to enclose the region including the pixel region. Each pillar has a depth of 0.5 μm, a length of 0.5 μm and a width of 0.5 μm Further, in the manufacture of the liquid crystal display panel in which the clearance of the black matrix and the TFT substrate was 2.1 μm, the width of the roughened layers was made 4.2 mm so that the lead time from the time immediately after the end of the bonding step until the time immediately before the start of the heat curing step is within two minutes.

The target value of the gap between the substrates in the pixel region was 2.0 μm.

Meanwhile, in the step for forming a low wettability structure for the TFT substrate, similar micromachining was applied to the surface opposite to the above described roughened surface layers of the CF substrate. In this manner, on the TFT substrate, the pillar-shaped roughed surface layers on which pillars are formed at the pitches of 1 μm were also formed into a closed curve shape with a width of 4.2 mm similarly to the CF substrate. Each pillar has a depth of 0.5 μm, a length of 0.5 μm and a width of 0.5 μm Next, in the seal coating step, a hybrid type seal material was coated onto the predetermined position so as to enclose the pixel region. The seal material was coated into the closed curve shapes respectively as the outer periphery (auxiliary) seal and as the main seal.

Next, in the liquid crystal dropping step, the liquid crystal material was dropped in a matrix shape into the region enclosed by the above described main seal by a predetermined drip amount.

Thereafter, in the bonding step, both the above described substrates are brought into contact with each other and pressurized, whereby the gap between the substrates was uniformly formed while the liquid crystal material was uniformly diffused into the entire pixel region between the substrates.

Subsequently, at the time of transfer for the next step, UV curing was partially performed at several spots so that the seal material is temporary fastened. Next, in the UV curing step, the seal material was cured by a UV irradiation amount of 3000 mJ. At this time, it was confirmed that due to the existence of the above described roughened surface layers, the seal material in the uncured state and the liquid crystal material were not in contact with each other. Subsequently, in the next heat curing step, the seal material was completely cured by being heated at 120° C. for an hour. At the time when heating was started, it was confirmed that due to the existence of the above described roughened surface layers, the seal material in the semi-cured state and the liquid crystal material were not in contact with each other. Thereafter, when heat curing of the seal material was completed, the liquid crystal material diffused and was filled into the entire region inside the main seal. Subsequently, the seal material and the liquid crystal material were in contact with each other, and the gap was also formed in the vicinity of the black matrix. After completion of heat curing, the gap in the display part of the liquid crystal display panel and in the vicinity of the black matrix was measured. As a result, it was recognized that the uniform gap was obtained in the entire region of display part.

A high temperature/high humidity test was carried out for the liquid crystal display panel of the example thus manufactured. As a result of the drive test that was carried out for 1500 hours in an environment having temperature of 60° C. and a humidity of 60%, occurrence of a stain, unevenness, and seal removal was not observed in the seal peripheral portion of the liquid crystal display panel. Specifically, the liquid crystal display panel was in a favorable display state.

For comparison, the liquid crystal display panel in which the roughened surface layer was not formed was produced, and a similar test was performed. At the time when the drive test reached 1000 hours, occurrence of a stain in the seal peripheral portion was observed.

A Fifth Example

Next, as a fifth example, another method of manufacturing an IPS mode liquid crystal display panel, which is the liquid crystal display panel according to the fourth exemplary embodiment of the present invention, will be described.

In the step for forming a low wettability structure for the CF substrate, ashing was applied to surface 23 of interface of the black matrix between the pixel region and the seal coating position with a plasma ashing device. At this time, as treatment gas, oxygen or a mixture gas of nitrogen and oxygen was used, and a scan type plasma ashing head was driven. Thereby, plasma was pinpoint irradiated to the region where the roughened shape was formed. Thus, the hole-shaped roughened surface layers each with a diameter of 80 nm or less were formed into a closed curve shape in the peripheral portion of the pixel region.

Further, in the manufacture of the liquid crystal display panel in which the clearance of the black matrix and the TFT substrate was 2.1 μm, the width of the roughened layers was made 4.2 mm, in order that the lead time from the time immediately after the end of the bonding step until the time immediately before the start of the heat curing step is within two minutes. The target value of the gap between the substrates in the pixel region was 2.0 μm. Meanwhile, in the step for forming a low wettability structure for the TFT substrate, similar ashing was applied to the surface opposite to the above described roughened surface layers of the CF substrate. In this manner, on the TFT substrate side, the hole-shaped roughened surface layers each with a diameter of 80 nm or less were also formed into a closed curve shape with a width of 4.2 mm similarly to the CF substrate.

Next, in the seal coating step, a hybrid type seal material was coated onto the predetermined position so as to enclose the pixel region. The seal material was coated into the closed curve shapes respectively as the outer periphery (auxiliary) seal and as the main seal.

Next, in the liquid crystal dropping step, the liquid crystal material was dropped in a matrix shape into the region enclosed by the above described main seal by a predetermined drip amount.

Thereafter, in the bonding step, both the above described substrates are brought into contact with each other and pressurized, whereby the gap between the substrates was uniformly formed while the liquid crystal material was uniformly diffused to the entire pixel region between the substrates.

Subsequently, at the time of transfer for carrying out the next step, UV curing was partially performed at several spots so that the seal material is temporary fastened. In the next UV curing step, the seal material was cured by a UV irradiation amount of 3000 mJ. At this time, it was recognized that the seal material in the uncured state and the liquid crystal material were not in contact with each other. Next, in the heat curing step, the seal material was completely cured by being heated at 120° C. for an hour. At the time when heating was started, it was observed that the seal material in the semi-cured state and the liquid crystal material were not in contact with each other. Thereafter, when heat curing of the seal material was completed, the liquid crystal material diffused and was filled into the entire region inside the main seal. The seal material and the liquid crystal material were in contact with each other, and the gap was also formed in the vicinity of the black matrix. After the completion of heat curing, measurement of the gap in the display part of the liquid crystal display panel and in the vicinity of the black matrix was carried out. As a result, it was observed that a uniform gap was obtained in the entire region of the display part.

A high temperature/high humidity test was carried out for the liquid crystal display panel of the example thus manufactured. As a result of the drive test that was carried out for 1500 hours in an environment having a temperature of 60° C. and a humidity of 60%, occurrence of a stain, unevenness, and seal removal were not observed in the seal peripheral portion of the liquid crystal display panel. Specifically, the liquid crystal display panel was in a favorable display state.

For comparison, the liquid crystal display panel in which the roughened surface shape was not formed was produced, and a similar test was performed. At the time when the drive test reached 1000 hours, occurrence of a stain in the seal peripheral portion was observed.

A Sixth Example

Next, as a sixth example, a method of manufacturing a TN mode liquid crystal display panel according to the fifth exemplary embodiment of the present invention will be described.

In the step for forming a low wettability structure for the CF substrate, surface 23 of interface of the black matrix between the pixel region and the seal coating position is formed as a roughened surface layer. The roughened surface layer is formed by micromachining using a focused ion beam (FIB) device. More specifically, the pillar-shaped roughened surface layers on which the pillars are formed at pitches of 1

μm ([Ra]/[Sm]=0.25) were formed into a closed curve shape so as to enclose the region including the pixel region. Each pillar has a depth of 0.5 μm, a length of 0.5 μm and a width of 0.5 μm.

Further, fluorine molecules are locally deposited on the above described pillar-shaped roughened surface layer using a film deposition device. Thereafter, fluoridation treatment as polymerization treatment is performed, and the fluorine film having a film thickness of about 100 nm is formed.

In the example, the liquid crystal display panel of the frame narrowing structure in which the clearance distance of the black matrix and the TFT substrate was 1.8 μm was manufactured under the condition in which the lead time from the time immediately after the end of the bonding step until the time immediately before the start of the heat curing step is within two minutes. For this purpose, the width of the roughened surface layer was made 2.8 mm. In the example, the target value of the gap in the pixel region was 1.7 μm.

Meanwhile, in the step for forming a low wettability structure for the TFT substrate, the roughened surface layer and the liquid crystal repellent film were formed on surface 23 of interface of the TFT substrate as described above. More specifically, the roughened surface layer and the liquid crystal repellent film were formed on the surface of the TFT substrate in the frame region, which is the surface opposite to the above described roughened surface layer and the fluorine film of the CF substrate.

In this manner, on the TFT substrate, the pillar-shaped roughed surface layer and fluorine film with a thickness of 100 nm were also formed into closed curve shapes with a width of 2.8 mm similarly to the CF substrate. Each pillar on the pillar-shaped roughed surface layer has a depth of 0.5 μm, a length of 0.5 μm and a width of 0.5 μm.

Next, in the seal coating step, a hybrid type seal material which is UV-curable and heat curable was coated onto the predetermined position so as to enclose the pixel region. The seal material was coated into the closed curve shapes respectively as the outer periphery (auxiliary) seal and as the main seal.

Next, in the Ag coating step, the AG-transfer was coated to be in a dotted form onto the predetermined position at the outside of the above described main seal.

Next, in the liquid crystal dropping step, the liquid crystal material was dropped in a matrix form into the region enclosed by the above described main seal by a predetermined drip amount.

Thereafter, in the bonding step, both the above described substrates are brought into contact with each other and pressurized, whereby the gap between the substrates was uniformly formed while the liquid crystal material was uniformly diffused into the entire pixel region between the substrates.

Subsequently, for carrying out the next step, at the time of the transfer of the substrates, UV curing was partially performed at several spots so that the seal material is temporary fastened. In the UV curing step which is carried out next, the seal material was cured by a UV irradiation amount of 3000 mJ. At this time, it was confirmed that due to the existence of the above described roughened surface layer, the seal material in the uncured state and the liquid crystal material were not in contact with each other.

Next, in the heat curing step, the seal material was completely cured by being heated at 120° C. for an hour. At the time when heating was started, it was observed that the seal material in the semi-cured state and the liquid crystal material were not in contact with each other. Thereafter, when heat curing of the seal material was completed, the liquid crystal material diffused and was filled into the entire region inside the main seal. Subsequently, the seal material and the liquid crystal material were in contact with each other, and the gap was also formed in the vicinity of the black matrix in the frame region. After the completion of heat curing, the gap was measured in the display part of the liquid crystal display panel and in the vicinity of the black matrix. As a result, it was observed that the gap between the substrates was uniformly formed for the entire pixel region which is the region for displaying an image.

A high temperature/high humidity test was performed for the liquid crystal display panel of the example thus manufactured. As a result of the drive test that was carried out for 1500 hours in an environment having a temperature of 60° C. and a humidity of 60%, a stain, unevenness, and seal removal were not observed in the seal peripheral portion of the liquid crystal display panel. Specifically, the liquid crystal display panel was in a favorable display state.

For comparison, the liquid crystal display panel having the roughened surface layer was manufactured, and a similar test was performed. In this case, at the time when the drive test reached 1000 hours, a stain occurred in the seal peripheral portion, and further, a part of the seal material was removed.

The liquid crystal display panel according to the present invention is preferably usable for a liquid crystal display device using the liquid crystal display panel.

While preferred embodiments of the present invention have been described using specific terms, such description is for illustrative purposes only, and it is to be understood that changes and variations may be made without departing from the spirit or scope of the following claims.

What is claimed is:

1. A liquid crystal display panel, comprising:
a pair of opposed substrates;
a seal material bonding said pair of substrates to each other, the seal material encloses a region including a pixel region, the pixel region having a liquid crystal alignment layer on said substrates; and
a liquid crystal material formed by dropping liquid crystal material directly on a low wettability structure and directly in the region enclosed by said pair of substrates and said seal material,
wherein a surface of an interface which is made up of at least one substrate of said pair of substrates and which is in a frame region enclosed by an outer periphery of said pixel region and an inner periphery of said seal material, includes the low wettability structure in which wettability of said liquid crystal material is lower than wettability of surfaces of said pair of opposed substrates in said pixel region,
wherein said low wettability structure is a liquid crystal repellent film which repels said liquid crystal material,
wherein a light-shielding black matrix is formed on the surface of interface of the other substrate of said pair of substrate in said frame region,
wherein said liquid crystal repellent film is formed on said light-shielding black matrix, and
wherein a surface of the substrate on which the liquid crystal material is dropped is substantially flat in the region directly enclosed by the seal material.

2. The liquid crystal display panel according to claim 1, wherein the contact angle of said liquid crystal material on said low wettability structure is larger than the contact angles of said liquid crystal material on said surfaces of interface of said pair of substrates in said pixel region.

3. The liquid crystal display panel according to claim 1, wherein said low wettability structure is formed into a closed curve shape so as to enclose said pixel region.

4. The liquid crystal display panel according to claim 1, wherein said low wettability structure is made of a fluorine.

5. A method of manufacturing a liquid crystal display panel, comprising:

coating a seal material formed into a closed curve shape to enclose a pixel region on one substrate out of a pair of substrates, dropping a liquid crystal material into a region directly enclosed by said seal material, of said one substrate, bonding said pair of substrates to each other, and curing said seal material to seal said liquid crystal material, further comprising:

forming a low wettability structure so as to have wettability to said liquid crystal material that is lower than wettability of the surface of said substrate in said pixel region, on a surface of an interface, which is the surface of interface made up of at least one substrate out of said pair of substrates, and which is in contact with said liquid crystal material in a frame region enclosed by an outer periphery of said pixel region and an inner periphery of said seal material, and wherein in forming said low wettability structure, a liquid crystal repellent film which repels said liquid crystal material is formed as said low wettability structure, wherein a light-shielding black matrix is formed on the surface of interface of the other substrate of said pair of substrates in said frame region before coating said seal material, wherein said liquid crystal repellent film is formed on said light-shielding black matrix, and wherein a surface of the substrate on which the liquid crystal material is dropped is substantially flat in the region directly enclosed by the seal material.

6. The method of manufacturing a liquid crystal display panel according to claim 5, wherein in forming said low wettability structure, a fluorine film is formed as said low wettability structure.

7. The method of manufacturing a liquid crystal display panel according to claim 5, wherein in forming said low wettability structure, a region in which said low wettability structure is formed is set by referring to a time until said seal material is cured after said pair of substrates are bonded to each other, an angle of contact between a surface of said low wettability structure and said liquid crystal material, and a diffusion speed of said liquid crystal material.

8. The method of manufacturing a liquid crystal display panel according to claim 5, wherein forming said low wettability structure is carried out for said one substrate before said liquid crystal material is dropped, and is carried out for the other substrate of said pair of substrates before said pair of substrates are bonded to each other.

* * * * *